United States Patent
Hart

[19]

[11] Patent Number: 6,050,650
[45] Date of Patent: Apr. 18, 2000

[54] APPLICATION SOLENOID VALVE FOR ELECTRONICALLY CONTROLLED FREIGHT TRAIN BRAKE SYSTEM

[75] Inventor: James E. Hart, Westmoreland County, Pa.

[73] Assignee: Westinghouse Air Brake Company, Wilmerding, Pa.

[21] Appl. No.: 09/112,722

[22] Filed: Jul. 9, 1998

[51] Int. Cl.[7] .................................................. B60T 13/00
[52] U.S. Cl. .................................................. 303/15; 303/20
[58] Field of Search .................................. 303/15–18, 86, 303/70, 33, 36, 37, 40, 7, 3, 81, 20, 28–30; 701/70; 137/624.11, 596.16, 596.18

[56] References Cited

U.S. PATENT DOCUMENTS

| | | | |
|---|---|---|---|
| 4,162,107 | 7/1979 | Bazilevich et al. | 303/3 |
| 4,904,027 | 2/1990 | Skantar et al. | 303/15 |
| 5,064,251 | 11/1991 | Romansky | 303/3 |
| 5,104,203 | 4/1992 | Ferri | 303/15 |
| 5,332,297 | 7/1994 | Cunkelman et al. | 303/15 |
| 5,358,315 | 10/1994 | Balukin | 303/15 |
| 5,393,129 | 2/1995 | Troiani et al. | 303/86 |
| 5,454,399 | 10/1995 | Kazakis et al. | 137/596.16 |
| 5,503,469 | 4/1996 | Cunkelman | 303/15 |
| 5,785,392 | 7/1998 | Hart | 303/20 |
| 5,984,426 | 11/1999 | Hart | 303/15 |

*Primary Examiner*—Douglas C. Butler
*Attorney, Agent, or Firm*—Buchanan Ingersoll, P.C.

[57] ABSTRACT

An brake application solenoid valve arrangement for use in an electronic freight train brake control system on a railway car. Such braking system having a brake pipe normally charged with fluid at a certain pressure, separate compartment auxiliary and emergency reservoirs charged at certain pressures with fluid from the brake pipe and a fluid pressure activated brake cylinder device. Flow of pressurized fluid from the separate auxiliary and emergency reservoirs can be selectively supplied concurrently to the brake cylinder device via the single brake application valve. Backflow check valves between each reservoir and the brake application valve prevent the transfer of pressurized fluid between the reservoirs. The electronic controller can operate the application valve to control the braking and release functions responsive to electrical command signals. A pneumatic control valve can also be operatively incorporated into the brake control system.

12 Claims, 6 Drawing Sheets

FIG. 4

APPLICATION SOLENOID VALVE FOR ELECTRONICALLY CONTROLLED FREIGHT TRAIN BRAKE SYSTEM

BACKGROUND

The present invention relates to railway braking systems, and more particularly to combined electronic and pneumatic braking systems for railway freight trains.

Railway freight braking systems traditionally have utilized a pneumatic brake system that is operated pneumatically and in which the control functions are obtained through utilization of pneumatic valves. These braking systems include a brake pipe for pneumatic communication between the locomotive and each individual car in the train. The pneumatic brake pipe has been utilized in a multi-function role, including charging reservoirs on-board each individual freight car; instituting brake applications; and controlling the release of the brakes on the train. Such systems utilize on-board pneumatic control valves such as, for example, ABD, ABDW, ABDX, or DB-60 valves on each freight car. Such cars can operate with pneumatic 26 TYPE Locomotive brake equipment or microprocessors types like EPIC equipment supplied by Westinghouse Air Brake Company. In these systems the level of desired brake pressure can be controlled by the pressure in the brake pipe which is controlled from the locomotive. An advantage of this type of system is the utilization of a single pneumatic communication, the brake pipe, running the length of the train.

Electronically controlled pneumatic (ECP) freight train braking systems are now being developed for long freight trains. In ECP brake systems, the role of the conventional pneumatic control valve can be replaced by an electronic controller which governs solenoid actuated valves on each car that control the brake operation. The electronic controller on each car can receive electrical command signals from the locomotive for controlling the braking functions of each car. Until recently, utilization of electrical command signals from a locomotive to control brake operation has been employed mainly in passenger trains and transit equipment, on relatively short trains. Conventionally, an electrical command signal is sent from the locomotive through the length of the train, with the signal level controlling both the propulsion and the desired amount of braking. In the past, such ECP braking systems were not generally utilized in freight brake operations, however, due to advances in technology, such ECP system are becoming more feasible in freight brake operations. Because a majority of freight trains can still use only the conventional pneumatic braking system, rail cars having an ECP system can frequently also include a pneumatic control valve. Such a combined system can be desirable so that the railcar can be used in either the newer ECP systems or the conventional pneumatic system, which is presently still the most prevalent type of freight train braking system.

In a typical such ECP combined freight train braking system having separate auxiliary and emergency reservoirs, the electronic controller governs two solenoid actuated brake application valves. One of the valves is connected between the auxiliary reservoir and a brake cylinder and the other is connected between the emergency reservoir and the brake cylinder. The electronic controller can also control a release valve connected to the brake cylinder for venting the brake cylinder to the atmosphere to release the brakes. In response to a command signal, the electronic controller can initiate service or emergency braking applications, or implement a release of the brakes. In such braking systems, where an electronic controller is utilized to control pneumatic equipment, the conventional practice has been to employ two separate brake application valves, one controlling the application of pressure from the auxiliary reservoir and one controlling the application of pressure from the emergency reservoir.

Two separate brake application valves are conventionally used to prevent the transfer of pressure between the separate reservoirs. Additionally, when a pneumatic control valve is included in the system, a separate brake application valve for each reservoir can be required for an ECP system to work properly because the pneumatic control valve relies on separate reservoirs to distinguish between maximum service and emergency brake cylinder pressures.

With electronic brake control it is possible to combine the separate auxiliary and emergency reservoirs into a single large reservoir, because the maximum brake cylinder pressure for service and emergency applications can be limited by the electronic processor. In this case, a single application solenoid may be employed to admit the air from the unified reservoir to the brake cylinder to apply the brakes.

Accordingly, there is a need for a combined electronic and pneumatic freight train braking system wherein the electronic controller can employ a single brake application valve instead of the previously utilized two brake application valves. Such a brake control system must properly and reliably control the braking functions on each car during both service and emergency braking applications, including whenever a pneumatic control valve is also a part of the system.

SUMMARY

According to the invention, a single application solenoid valve can be employed in place of the two solenoid valves typically utilized in a railcar having a combined electronic and pneumatic freight train brake control system. Such a combined system typically includes two separate reservoirs with both an electronic controller and a pneumatic control valve. Either, the electronic controller or a pneumatic control valve could independently control the braking functions on the railcar. They could also function in a complementary fashion. Such combined systems allow the railcar to be used both in trains which employ an ECP brake system and in trains which employ a conventional pneumatic brake system. Conventionally, in such a combined freight train brake control system, each railcar has: a brake pipe normally charged to a predetermined certain pressure; separate auxiliary and emergency reservoirs charged to nominally the same pressure from the brake pipe; a pressure activated brake cylinder device; and a pair of solenoid actuated brake application valves which can be operated by the electronic controller to control brake applications. In such a combined brake control system, according to the invention, air under pressure from each of the auxiliary and emergency reservoirs can be concurrently delivered to the brake cylinder through a single brake application valve instead of the pair of brake application valves typically used. The electronic controller can operate the lone brake application valve to control such delivery of pressurized fluid. The flow from each reservoir can be provided concurrently to the brake cylinder. Backflow check valves are provided between each reservoir and the lone brake application valve to prevent any transfer of pressurized fluid therebetween and to maintain pressure in each reservoir separately which is necessary when a pneumatic control valve is part of the brake control system. The backflow check valves can be separate from, or combined with, the single brake application valve.

It is an object of the present invention to provide means to allow the electronic control of service and emergency brake applications from conventional, separated auxiliary and emergency reservoirs with a single solenoid valve.

It is a corollary objective to reduce the complexity and cost of electronic brake control systems which require two application solenoid valves to perform these functions.

Other details, objects, and advantages of the invention will become apparent from the following detailed description and the accompanying drawings figures of certain presently preferred embodiments thereof.

BRIEF DESCRIPTION OF THE DRAWING FIGURES

A more complete understanding of the invention can be obtained by considering the following detailed description in conjunction with the accompanying drawings, in which.

DETAILED DESCRIPTION OF CERTAIN EMBODIMENTS

Figure 1A:
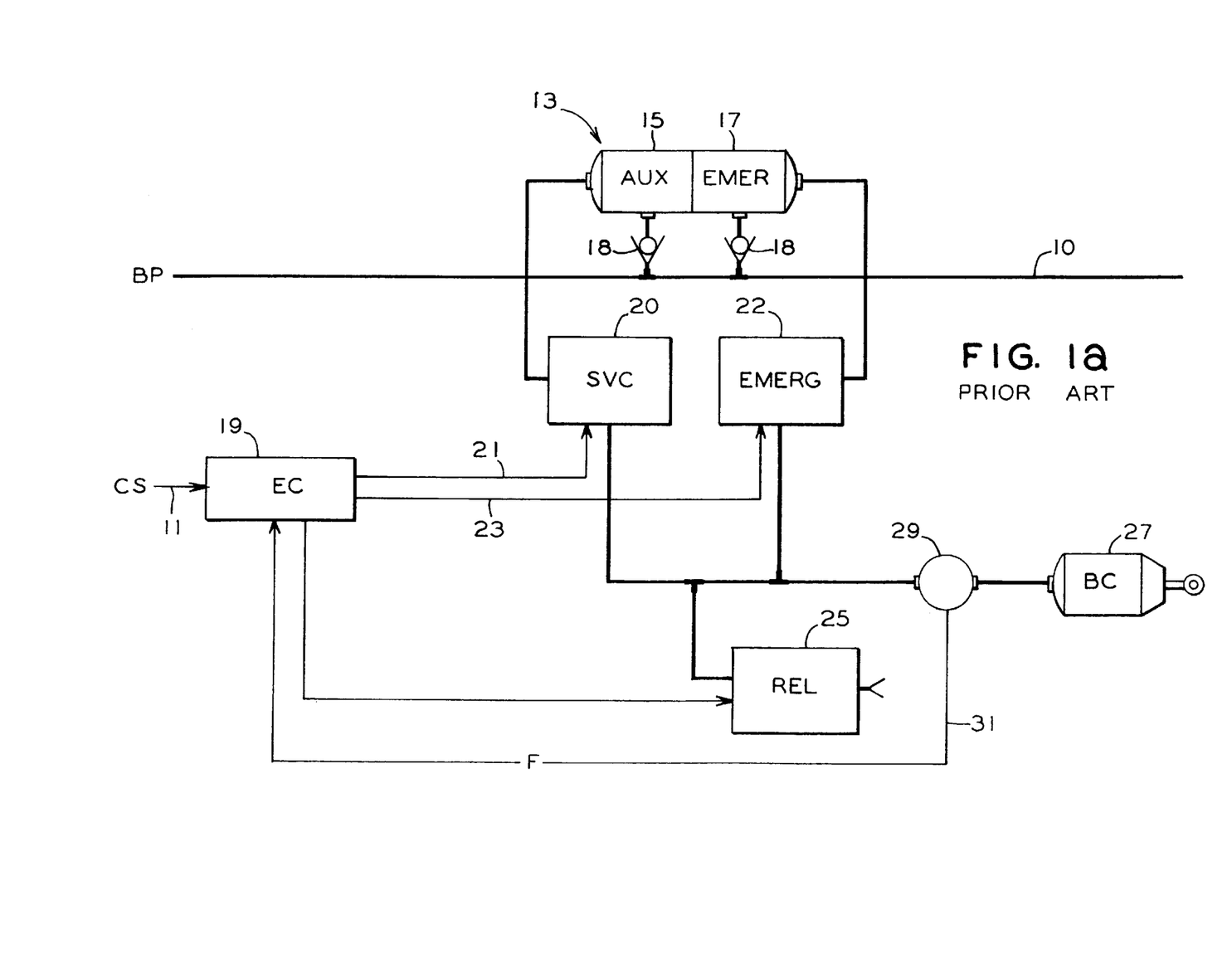
FIG. 1a is a diagrammatic representation which illustrates a prior art type ECP freight train braking control system.
Figure 1B:
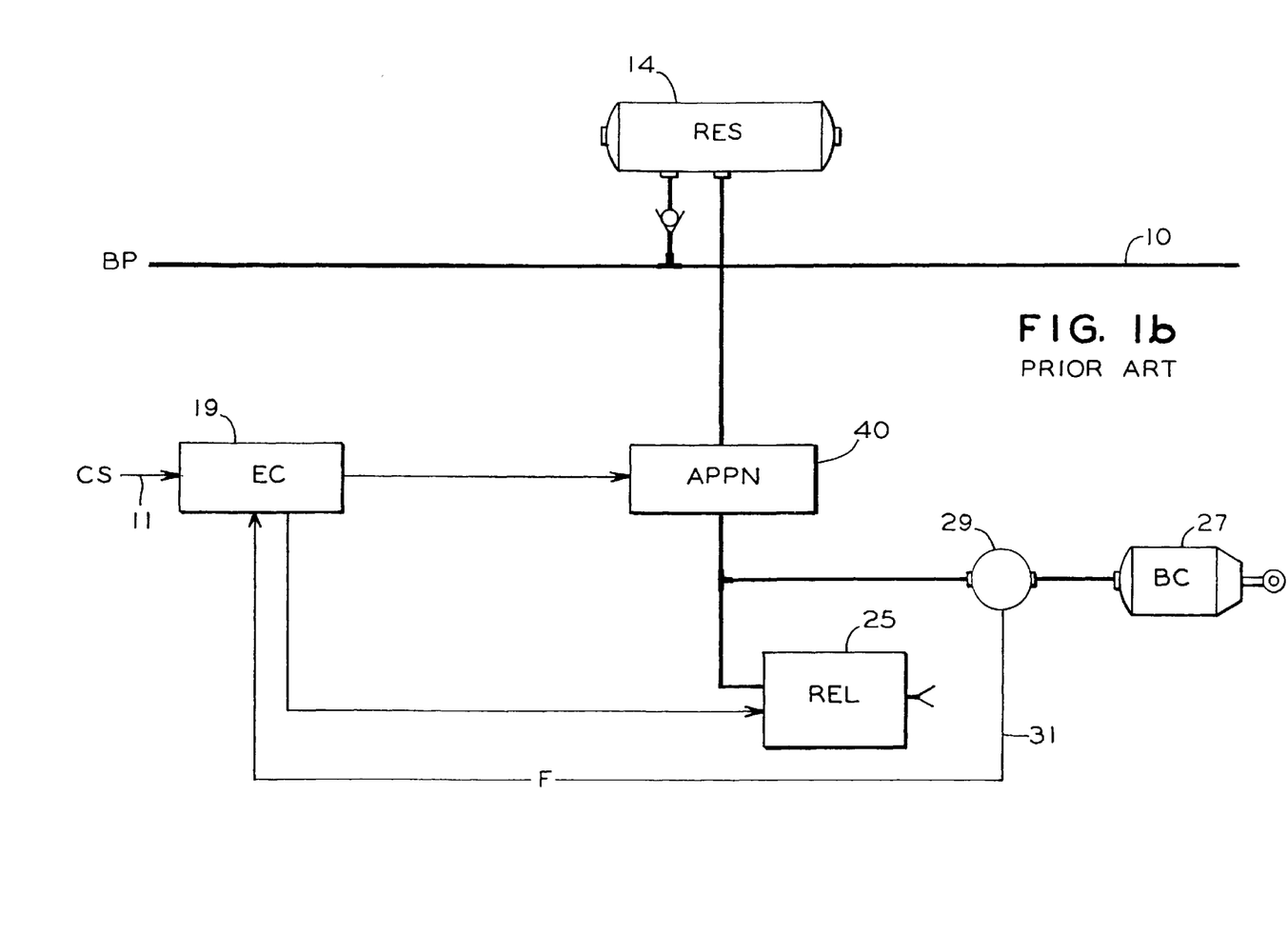
FIG. 1b is a diagrammatic representation which illustrates an alternatively configured ECP braking system having a combined reservoir and which uses a single application valve.
Figure 1C:
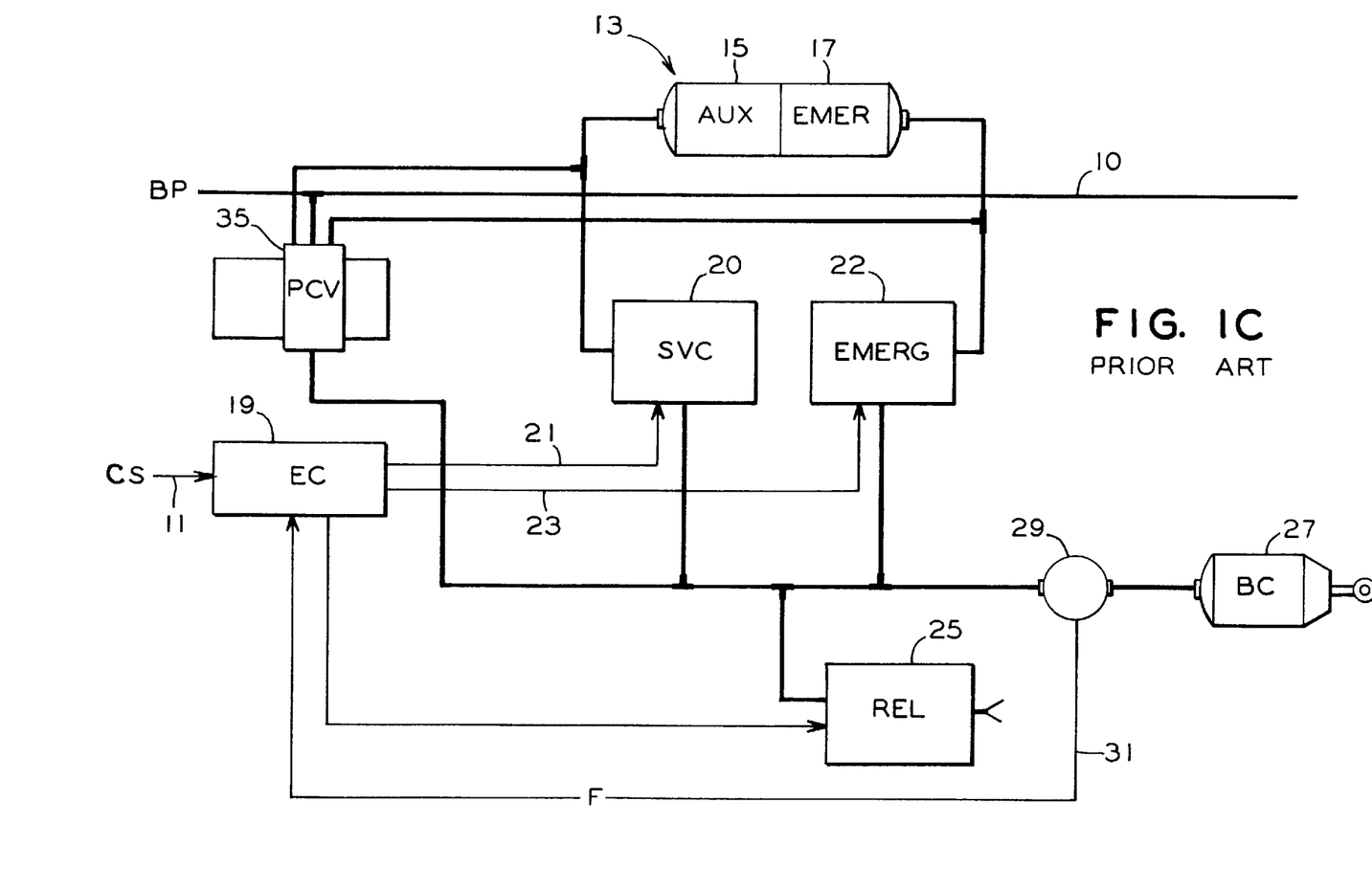
FIG. 1c is a diagrammatic representation which illustrates a prior art type combined pneumatic and ECP freight train braking control system.

Referring now to the several drawing figures wherein like elements are similarly numbered, it will be helpful to first describe certain prior art type freight train braking systems such as shown in FIGS. 1a through 1c.

A conventional electronically controlled pneumatic (ECP) brake system for freight car is shown in FIG. 1a wherein an electronic controller (EC) 19 controls two application valves 20, 22 to supply pressurized air to a brake cylinder (BC) 27 from a two compartment reservoir 13 of pressurized air to operate the brakes on each car. The EC 19 can also operate a release valve (REL) 25 to vent pressure from the BC 27 to the atmosphere (Atm) thereby releasing the brakes. In such a freight train braking system, a train brake pipe (BP) 10 interconnects the locomotive and each articulated car. The brake pipe 10 can supply pressurized air to each car in the train from a tank located on the locomotive. The two compartment reservoir 13 typically can have an auxiliary (AUX) reservoir portion 15 and a typically larger emergency (EMER) reservoir portion 17. The AUX reservoir 15 can be connected to an auxiliary application valve (AUX) 20 and the EMER reservoir 17 can be connected to an emergency application valve (EMER) 22. Each of the AUX 15 and EMER 17 reservoirs can be individually connected to the brake pipe 10 for maintaining pressurization of each reservoir as needed. Back flow check valves 18 can normally be provided between each reservoir 15, 17 and the BP 10 to prevent pressure from escaping out of the reservoirs into the BP 10 if the pressure in the BP 10 falls below the reservoir pressure. Conventionally, a separate brake application valve 20, 22 can be connected between each of the AUX 15 and EMER 17 reservoirs and the BC 27 to prevent the transfer of pressurized air between the separate EMER 17 and AUX 15 reservoirs Service (SVC) 20 and emergency (EMER) 22 brake application valves can be controlled by the EC 19 to communicate each reservoir 15, 17 with the BC 27, which is conventionally connected to a mechanical brake linkage (not shown), commonly referred to as "rigging." The BC 27 actuates the rigging to apply brake shoes to the wheels of the train to control the train's speed. The EC 19 can also control a release (REL) valve 25. In operation, the EC 19 can receive a command signal (S) 11 from the locomotive, for example, to initiate either a braking application or a release application. The EC 19 can also receive feedback (F) 31 from a pressure transducer 29 at the BC 27 to monitor the actual brake cylinder pressure. Additional pressure transducers, not shown, could also be provided, for example, at the AUX 15 and EMER 17 reservoirs and also at locations along the BP 10 to monitor the pressure in those locations.

In response to a service braking application via command signal 11 from the locomotive, the EC 19 can, for example, actuate the SVC valve 20 to supply pressurized air from the AUX 15 reservoir into the BC 27 to brake the train at a service level. When the speed of the train has been sufficiently controlled, a release command signal can be sent from the locomotive to the EC 19. In response, the EC 19 can control the SVC valve 20 to close off the AUX 15 reservoir and then actuate the REL 25 to open the BC 27 to atmosphere to release the brakes. Additionally, in response to an emergency application command signal 11, the EC 19 can actuate the EMER valve 22 to supply pressurized air from the EMER 17 reservoir to supply pressurized air to the BC 27.

With electronic brake control it is possible to combine the typically separate AUX 15 and EMER 17 reservoirs into a single large reservoir, as shown in FIG. 1b, because the maximum brake cylinder pressure for service and emergency applications can be limited by the EC 19. In such case, a single brake application valve APPN 40 may be employed to admit the air from the unified reservoir to the brake cylinder to apply the brakes without the need for the backflow check valves 43. Of course, a PCV could not be incorporated into such a system, for the reasons explained previously.

A conventional combined ECP and pneumatic braking system is illustrated in FIG. 1c. This combined ECP/pneumatic braking system can be similar to the system shown in FIG. 1a, except for the addition of a pneumatic control valve (PCV) 35 which is operatively incorporated into the system. The PCV 35 may, for example, be an ABDX type pneumatic control valve manufactured by Westinghouse Air Brake Company. The PCV 35 is connected to the brake pipe 10 and each of the AUX 15 and EMER 17 reservoirs and the BC 27. In this combined system, the backflow check values 18, shown in FIG. 1b, are provided within the PCV 35. Instead of being directly connected to the AUX 15 and EMER 17 reservoirs, the BP 10 supplies pressurized air to the PCV 35. Internal valves in the PCV 35 then control the supply of pressurized air from the BP 10 to the AUX 15 and EMER 17 reservoirs and prevent any undesirable transfer of pressurized air therebetween. However, the BP 10 could also be connected to each reservoir 15, 17 with the backflow check valves 18 as shown in FIG. 1a.

In this combined system, braking applications can be controlled by either the PCV 35 or the EC 19. In a pneumatic mode the PCV 35 can initiate braking and release applications in a conventional manner, i.e., in response to pressure changes in the BP 10. If the braking system is desired to be operated in an electro-pneumatic mode, the EC 19 can receive braking and release commands from the locomotive via the command signal 11. The EC 19 can respond to such signals 11 by actuating the appropriate application valve 21, 23. The EC 19 can also activate the REL 25 to release the brakes in response to a release command via command signal 11. As in FIG. 1a, a pressure transducer 29 at the BC 27 can provide feedback 31 to the EC 19. Additional pressure transducers could also be provided in the BP 10 and at the AUX 15 and EMER 17 reservoirs, if desired, to provide more feedback with respect to the pressure at those locations. Moreover, in the combined braking system, the PCV 35 can be utilized as a redundant system to provide a back-up function to the EC 19. For example, if a pressure variation in the BP 10 is detected, such as if a car broke apart from the train, the PCV 35 could immediately activate an emergency braking application regardless of the command signal 11 being received by the EC 19. The braking system can be configured in this manner because the train operator could signal the EC 19 that "all is well," not yet aware that a car has broken apart from the train. Although the EC 19 would sense a change in BP 10 pressure. Such a combined system also permits the freight car to be used both in a train wired for an ECP system and in a train controls the braking functions in a conventional pneumatic manner using a PCV 35.

Figure 2:
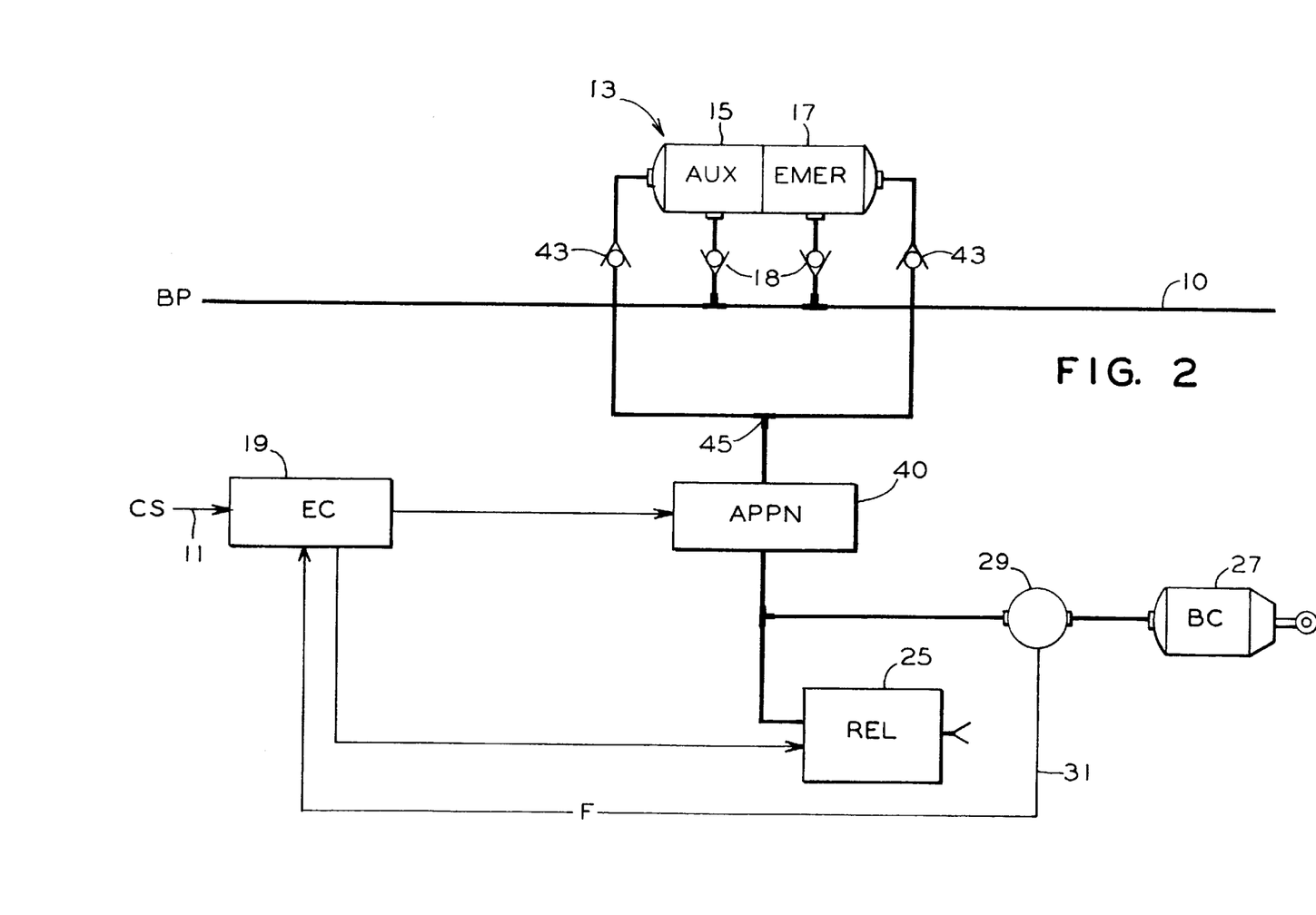
FIG. 2 is a diagrammatic representation which illustrates an ECP braking system which utilizes a single application valve.

An ECP freight train braking system according to an embodiment of the invention is illustrated in FIG. 2 having a single brake application valve (APPN) 40 substituted for the conventionally utilized separate SVC valve 20 and EMER valve 22. To prevent transfer of pressurized fluid between the separate AUX 15 and EMER 17 reservoirs, a pair of load differential backflow check valves 43 can be provided between the reservoirs and the APPN valve 40. Additionally, the PCV 35 requires the reservoirs to be separately maintained because it relies on separate reservoirs to distinguish between maximum service and emergency brake cylinder pressures. Thus, the backflow check valves 43 also make it possible to incorporate a PCV 35 into this ECP control system, if desired. The APPN valve 40 can be connected between each reservoirs 15, 17 and the BC 27 for controlling the concurrent delivery of pressurized fluid from both reservoirs 15, 17 to the BC 27. When the EC 19 receives a command signal 11 to initiate a service braking application the APPN valve 40 can be activated to supply air pressure from both the AUX 15 and EMER 17 reservoirs to the BC 27.

Thus, the use of two separate backflow check valves 43 eliminates the need for one of the two high capacity application valves 20, 22 conventionally used in ECP systems. This can both simplify control requirements and reduce size of the ECP equipment.

Figure 3:
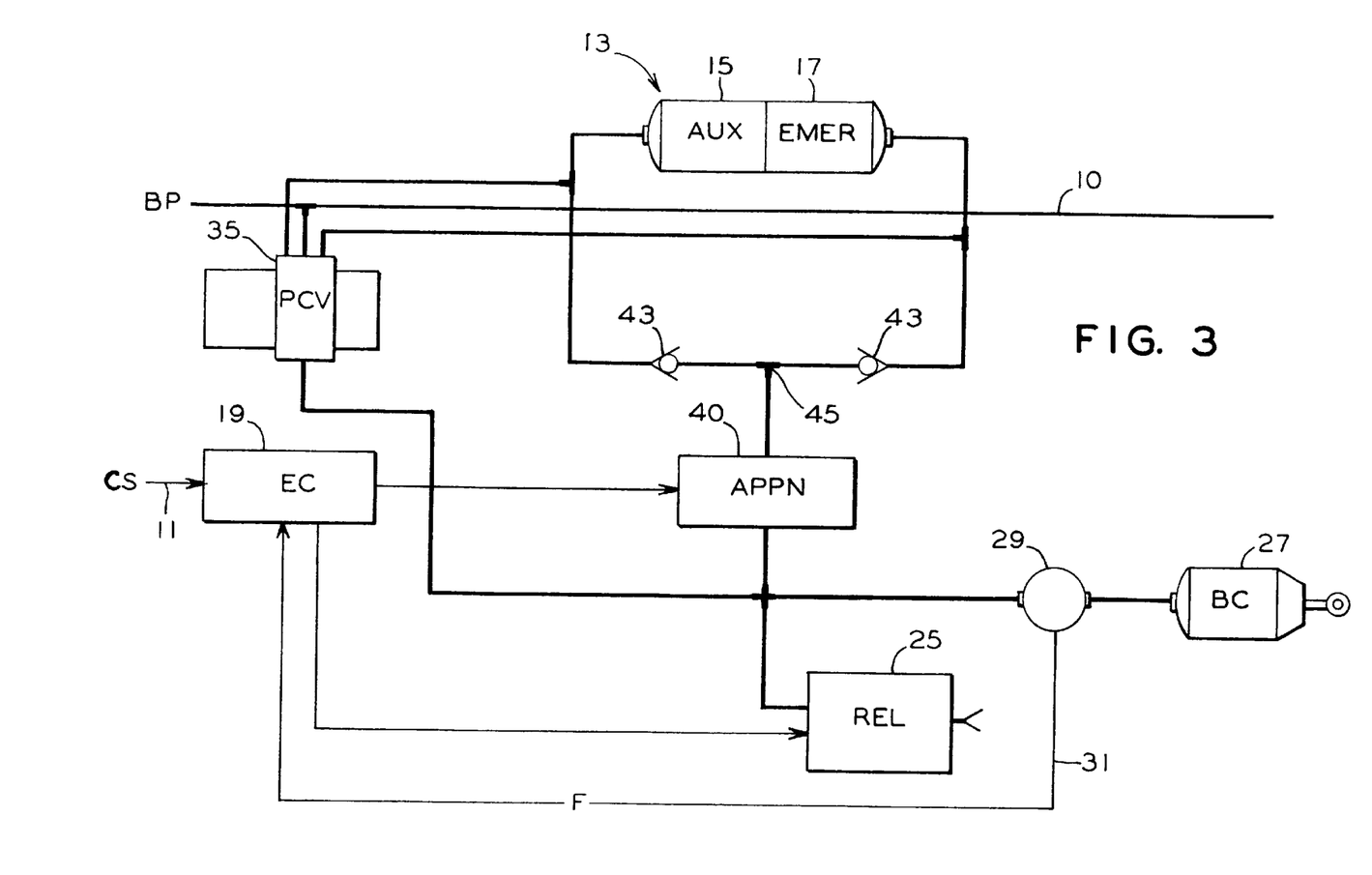
FIG. 3 illustrates a combined pneumatic and ECP braking system which utilizes a single combined application valve.

Another embodiment of a combined ECP and pneumatic controlled freight car braking system according to the invention is illustrated in FIG. 3, having both a PCV 35 and EC 19. In contrast to FIG. 1c, a single "combined" brake application valve APPN 40 replaces the conventionally utilized separate SVC valve 20 and EMER valve 22. In this configuration, as in FIG. 2a, a pair of backflow check valves 43 are provided between the APPN valve 40 and the reservoirs 15, 17.

When the system shown in FIG. 3 is operated in a pneumatic mode, the backflow check valves 43 prevent equalization of the AUX 15 and EMER 17 reservoirs. The check valve 43 thus maintains separate pressure in each reservoir, which, as explained previously, is necessary for the PCV 35 to function properly. The use of the two backflow check valves 43 thus eliminates the need for one of the two high capacity application valves 20, 22 otherwise required for a combined system having both an EC 19 and a PCV 35.

In addition to simplifying control requirements and reducing the size of the ECP equipment, cost can also be reduced since the high capacity application valves 20, 22 are generally more costly than a pair of the relatively simple backflow check valves 43.

If the EC 19 receives a command signal 11 to initiate a service braking application, the APPN valve 40 can be activated to concurrently deliver air pressure from both the AUX 15 and EMER 17 reservoirs to the BC 27.

Figure 4:
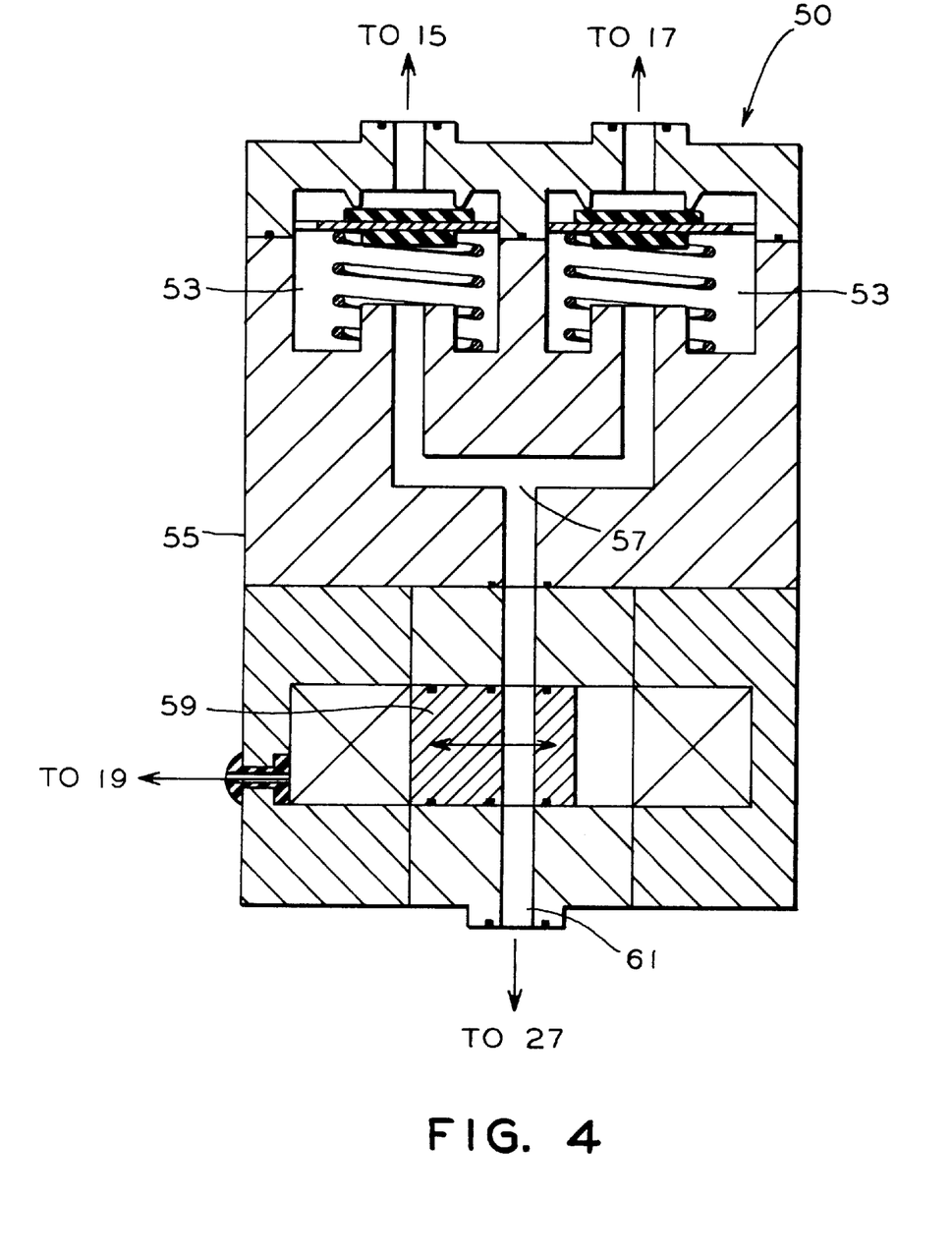
FIG. 4 is a detail view of an application valve assembly.

An alternative embodiment of an APPN solenoid valve 50 is shown in FIG. 4. In this configuration, a pair of backflow check valves 53 can be provided internally, as part of a valve housing 55. One side of each backflow valve 53 can communicate with a respective one of the AUX 15 and EMER 17 reservoirs. Flow through each backflow valve 53 can be joined within the valve housing 55 such that pressurized fluid from both the AUX 15 and EMER 17 reservoirs can be concurrently delivered to the BC 27. A solenoid actuated valve member 59 can be provided between the reservoirs 15, 17 and an outlet 61 from the valve housing 55 which communicates with the BC 27 for controlling the delivery of pressurized fluid through the APPN valve 50. The EC 19 can operate the APPN valve 50 to open or close the solenoid actuated value member 59 to control the delivery of pressurized fluid concurrently from the AUX 15 and EMER 17 reservoirs to the BC 27.

Although certain embodiments of the invention have been described in detail, it will be appreciated by those skilled in the art that various modification to those details could be developed in light of the overall teaching of the disclosure. Accordingly, the particular embodiments disclosed herein are intended to be illustrative only and not limiting to the scope of the invention which should be awarded the fill breadth of the following claims and any and all embodiments thereof.

What is claimed is:

1. An electronic freight train brake control system on a railcar having separate compartment auxiliary and emergency reservoirs, a brake pipe for charging the reservoirs with pressurized fluid and a fluid pressure activated brake cylinder device, said electronic freight train brake control system comprising:

a. an application valve in selective fluid communication with said brake cylinder device and each of said auxiliary and emergency reservoirs for controlling the flow of pressurized fluid from said reservoirs to said brake cylinder device;

b. a pair of backflow check valves, respective ones of said pair being interposed between said application valve and each of said auxiliary and emergency reservoirs, respectively to prevent an exchange of pressurized fluid between said reservoirs;

c. a release valve in selective fluid communication with said brake cylinder and an exhaust port; and d. an electronic controller operating said application valve and said release valve to control the braking functions of the railcar by supplying pressurized fluid concurrently from each of said auxiliary and emergency reservoirs to said brake cylinder device.

2. The freight train brake control system of claim 1 further comprising a pneumatic control valve operatively incorporated into such brake control system.

3. The freight train brake control system of claim 1 wherein flow of pressurized fluid from each of said reservoirs is combined prior to communicating with said application valve.

4. The freight train brake control system of claim 1 wherein flow of pressurized fluid from each of said reservoirs is combined within said application valve.

5. The freight train brake control system of claim 3 wherein said backflow check valves are interposed between said reservoirs and the point where said flow from said reservoirs is combined.

6. The freight train brake control system of claim 4 wherein the check valves are provided within said application valve between said reservoirs and the point where said flow from said reservoirs is combined.

7. The freight train brake control system of claim 1 further comprising a pneumatic control valve in selective fluid communication with at least one of said brake cylinder, said auxiliary and emergency reservoirs and an exhaust.

8. An electronic freight train brake control system on a railcar having separate compartment auxiliary and emergency reservoirs, a brake pipe for charging each reservoir with pressurized fluid and a fluid pressure activated brake cylinder device, the freight train brake control system comprising:
   a. an application valve having a housing with first and second passageways;
   b. said first passageway in fluid communication with said auxiliary reservoir;
   c. said second passageway in fluid communication with said emergency reservoir;
   d. said first and second passageways in selective fluid communication with said brake cylinder device;
   e. a valve member interposed between each of said first and second passageways and said brake cylinder for selectively controlling fluid communication therebetween;
   a pair of backflow check valves, respective ones of said pair being interposed between said valve member and each of said auxiliary and emergency reservoirs, respectively to prevent an exchange of pressurized fluid between said reservoirs;
   g. a release valve in fluid communication with at least said brake cylinder device and that atmosphere; and
   h. an electronic controller operating said valve member and said release valve to control the braking functions on the railcar.

9. The freight train brake control system of claim 8 further comprising a pneumatic control valve operatively incorporated into such brake control system.

10. A method for controlling the delivery of pressurized fluid to a fluid pressure activated brake cylinder device in an electronic freight train brake control system on a railway car having separate compartment auxiliary and emergency reservoirs and a brake pipe for charging each reservoir with pressurized fluid, the method comprising:
   a. concurrently supplying pressurized fluid from said auxiliary and emergency reservoirs to said brake cylinder device;
   b. preventing the transfer of pressurized fluid between said auxiliary and emergency reservoirs; and
   c. controlling said concurrently supplied pressurized fluid from said reservoirs to said brake cylinder device using a brake application valve responsive to an electronic controller.

11. The method of claim 10 further comprising providing a pneumatic control valve operatively incorporated into such electronic brake control system.

12. The method of claim 10 wherein said preventing the transfer of pressurized fluid between reservoirs further comprises individually preventing backflow into each of said auxiliary and emergency reservoirs.

* * * * *